March 30, 1948.  R. K. LEE  2,438,757
MOUNTING ELEMENT FOR MACHINES OR THE LIKE
Filed Sept. 16, 1944

INVENTOR.
ROGER K. LEE
BY
ATTORNEYS

Patented Mar. 30, 1948

2,438,757

UNITED STATES PATENT OFFICE 2,438,757

MOUNTING ELEMENT FOR MACHINES OR THE LIKE

Roger K. Lee, Detroit, Mich., assignor to Kenlee Corporation, Detroit, Mich., a corporation of Michigan Application September 16, 1944, Serial No. 554,376

3 Claims. (Cl. 248—22)

The present invention relates to rubber mountings or supports for machines of one sort or another in which prevention of the transmission of vibration to or from the machine is a prime consideration.

Rubber mountings for such purposes are quite common and have been used successively for a considerable period. However, the known forms do not provide for any adjustment to change their characteristics except in so far as the rubber element may be subjected to more or less compression.

Among the objects of the present invention is a rubber mounting that overcomes this objection by being adjustable in much the same manner as metal springs, viz., to build up or lower its spring characteristics.

Another object is a rubber mounting in the form of a suspension element adjustable to increase or decrease its displacement under load.

Figure 1:
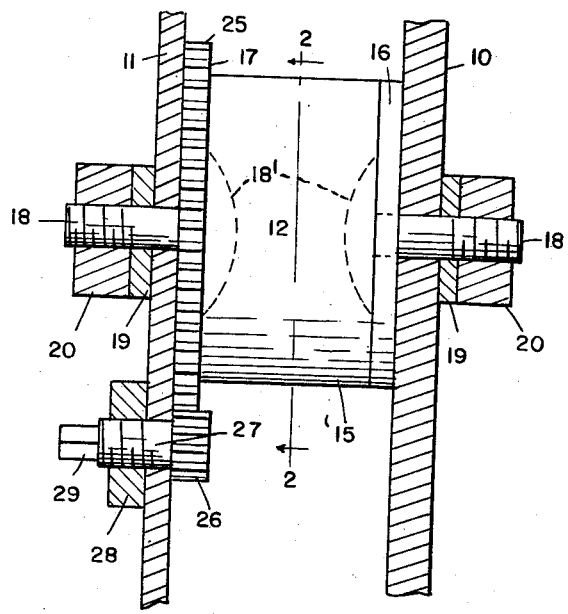

Other objects and advantages will be apparent to those skilled in the art upon reference to the following description and the accompanying drawings in which Figure 1 is a sectional longitudinal view of the rubber element and its attachment to a support and device being supported.

Figure 2:
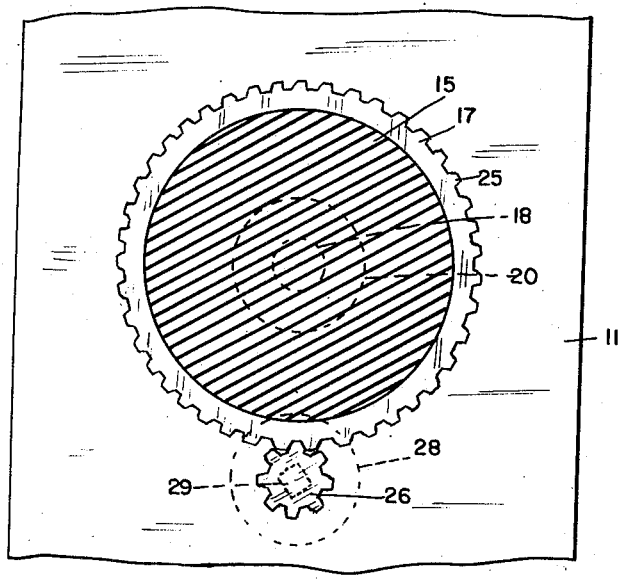

Figure 2 is a section on line 2—2 of Figure 1.

In the drawings, the elements 10 and 11 are suitable parts of a support and a supported device. It is immaterial which is which, but for clarity 10 will be considered as the support and 11 as a suitable part of the device being supported.

These parts are provided with suitable openings which furnish the parts for the attachment of the rubber supporting element indicated as a whole by 12.

The latter consists of a cylindrical rubber body 15 bonded on its flat ends to metal plates 16 and 17 each of which is centrally perforated and carries a short bolt or screw 18, the heads 19 of which are embedded in and bonded to the rubber 15. The two screws 18 extend through the elements 10 and 11 and are fixable thereto by suitable lock washers 19 and nuts 20.

Of the two plates 16 and 17, the plate 17 is shown to be in the form of a gear 25 of somewhat larger diameter than the rubber body 15 adapted to mesh with and be rotatable by a smaller gear 26, fixed to a suitable stud 27 extending through element 11 and threaded for the reception of a nut 28. The outer end 29 of the stud 27 is suitably squared or of hexagon or other form so that a suitable wrench may be used to rotate the small gear 26.

By providing the gears 25 and 26, the rubber element 15 may be put under torsion in either direction and such torsion varied to suit the particular conditions, by simply loosening nuts 20 and 28. Then after suitable rotation of gear 26, tightening the nuts 20 and 28 again. The torsion stresses in the rubber 15 also result in shearing stresses adjacent the plates 16 and 25.

Now having described the invention and the preferred embodiment thereof, it is to be understood that said invention is to be limited, not to the specific details herein set forth, but only by the scope of the claims which follow:

What I claim is:

1. A mounting element for machines or the like consisting of a rubber body provided with means at one end for fixing said body to a suitable support, means at its opposite end for fixing said body to the machine to be mounted, said latter means including a plate bonded to said body, means for rotating said plate, whereby to generate torsion stresses in said body, and means for fixing said plate against return rotation.

2. A mounting for machines or the like consisting of a rubber body provided with means at one end for fixing said body to a suitable support, means at its opposite end for fixing said body to the machine to be mounted, said latter means including a plate in the form of a gear bonded to said body, means for rotating said plate, whereby to generate torsion stresses in said body, said rotating means consisting of a second gear meshing with the first, means whereby the second gear may be rotated, and means for fixing said plate against return rotation.

3. A mounting element for machines or the like consisting of a cylindrical rubber body having fixed to each end a metal plate and means for affixing said plates to a machine to be mounted and to a support respectively, one of said plates being provided with means whereby it may be at least partially rotated relative to the other and means for finally fixing said plates in position after such relative rotation to said machine and support.

ROGER K. LEE.

REFERENCES CITED

The following references are of record in the file of this patent:

UNITED STATES PATENTS

| Number | Name | Date |
| --- | --- | --- |
| 2,144,848 | Miller | Jan. 24, 1939 |

FOREIGN PATENTS

| Number | Country | Date |
| --- | --- | --- |
| 668,293 | France | Oct. 30, 1939 |
| 501,167 | Great Britain | Feb. 22, 1939 |